(12) United States Patent
Gedl et al.

(10) Patent No.: US 6,332,056 B1
(45) Date of Patent: Dec. 18, 2001

(54) CIRCUIT ARRANGEMENT FOR PROCESSING A VIDEO SIGNAL, INCLUDING MEANS FOR AVOIDING A VERTICAL COLOR SHIFT AT HORIZONTAL COLOR TRANSITIONS

(75) Inventors: Karl Gedl, St. Pölten; Willibald Friedreich; Thomas Schuhmacher, both of Vienna; Andreas Überreiter, Gross-Siegharts, all of (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/195,050

(22) Filed: Nov. 18, 1998

(30) Foreign Application Priority Data

Nov. 20, 1997 (EP) .................................................. 97890230

(51) Int. Cl.$^7$ ...................................................... H04N 9/77
(52) U.S. Cl. ................................ 386/21; 386/22; 386/25; 348/609; 348/624; 348/642
(58) Field of Search .................................. 386/21, 22, 25; 348/610, 609, 607, 624, 627, 630, 631, 642, 663, 665, 667, 669, 670, 724

(56) References Cited

U.S. PATENT DOCUMENTS 4,864,389 * 9/1989 Faroudja et al. ..................... 348/670
4,961,108 * 10/1990 Perlman ................................. 386/25
5,179,450 * 1/1993 Ando et al. ........................... 386/22
5,187,567 * 2/1993 Srivastava ........................... 348/627

FOREIGN PATENT DOCUMENTS

4022923A1    1/1992  (DE) .

* cited by examiner

*Primary Examiner*—Wendy R. Garber
*Assistant Examiner*—Christopher Onuaku
(74) *Attorney, Agent, or Firm*—Edward W. Goodman

(57) ABSTRACT

A video recorder, includes: a filter for performing a comb-filtering operation and supplying a comb-filtered component of a video signal; controllable influencing apparatus for terminating the output of the comb-filtered component and activating instead, the propagation of the non-filtered component; transition detection apparatus for detecting a vertically extending transition and supplying characteristic information upon detection of such a transition; control information generating apparatus, arranged between the transtion detection apparatus and the influencing apparatus, for generating control information enabling the termination of the output of the comb-filtered component and the activation of the propagation of the non-filtered component for a period of time which is longer than possible by means of the characteristic information.

8 Claims, 3 Drawing Sheets

CIRCUIT ARRANGEMENT FOR PROCESSING A VIDEO SIGNAL, INCLUDING MEANS FOR AVOIDING A VERTICAL COLOR SHIFT AT HORIZONTAL COLOR TRANSITIONS

BACKGROUND OF THE INVENTION

1. Field of the Invention

The invention relates to a circuit arrangement for processing a video signal which contains a brightness component and a color component and may include video signal segments representing vertically extending transitions in a visually observable rendition, the circuit arrangement comprising filter means for processing one of the two components of the video signal in conformity with the comb filter principle, the filter means comprising a direct branch and a delay branch, the direct branch propagating the processable component of the video signal essentially without delay, while the delay branch includes delay means for delaying the processable component of the video signal by the duration of at least one line, and also comprising combination means following the direct branch and the delay branch for combining the component of the video signal propagated essentially without delay and the delayed component of the video signal, and for outputting the comb-filtered component of the video signal, the circuit arrangement also comprising a switching stage following the filter means for further processing the comb-filtered component of the video signal, controllable influencing means for terminating propagation of the comb-filtered component of the video signal to the switching stage, and, at the same time, for activating propagation of this component of the video signal, in at least essentially non-filtered form, to the switching stage, and transition detection means for detecting a vertically extending transition, represented by at least one of the two components, and whereby, upon detection of such a transition, characteristic information is generated and applied to output means of the transition detection means, the output means of the transition detection means being connected to the controllable influencing means via connection means in such a manner that, when characteristic information is output via the output means, the controllable influencing means ensures termination of the propagation of the comb-filtered component of the video signal and activation of the propagation of this component of the video signal in at least essentially non-filtered form.

The invention also relates to a video recorder which includes a circuit arrangement for processing a video signal which contains a brightness component and a color component and may include video signal segments representing vertically extending transitions in a visually observable rendition, the circuit arrangement comprising filter means for processing one of the components of the video signal in conformity with the comb filter principle, the filter means comprising a direct branch and a delay branch, the direct branch propagating the processable component of the video signal essentially without delay, while the delay branch includes delay means for delaying the processable component of the video signal by the duration of at least one line, and also comprising combination means following the direct branch and the delay branch for combining the component of the video signal propagated essentially without delay and the delayed component of the video signal, and for outputting the comb-filtered component of the video signal, the circuit arrangement also comprising a switching stage following the filter means for further processing the comb-filtered component of the video signal, controllable influencing means for terminating propagation of the comb-filtered component of the video signal to the switching stage, and, at the same, for activating time propagation of this component of the video signal, in at least essentially non-filtered form, to the switching stage, and transition detection means for detecting a vertically extending transition, represented by at least one of the two components, and whereby, upon detection of such a transition, characteristic information is generated and applied to output means of the transition detection means, the output means of the transition detection means being connected to the controllable influencing means via connection means in such a manner that, when characteristic information is output via the output means, the controllable influencing means ensures termination of the propagation of the comb-filtered component of the video signal and activation of the propagation of this component of the video signal in at least essentially non-filtered form.

2. Description of the Related Art

A circuit arrangement of the kind set forth in the first paragraph and a video recorder of the kind set forth in the second paragraph are known, for example, from German Patent DE 40 22 923 A1.

In the known circuit arrangement and in the known video recorder, the output means, formed by an output of the transition detection means (consisting of a color difference recognition circuit), receives a characteristic pulse as the characteristic information from the transition detection means and is connected directly, via a connection lead, which is provided as the connection means, to the filter means which is formed by a simple comb filter and which receives the color component, so the color signal, of a video signal to be processed in order to subject the color signal to an operation for eliminating crosstalk by means of the filter means. In the known circuit arrangement, it is a problem that, upon detection of a transition extending vertically in a visually observable rendition, the color difference recognition circuit outputs a characteristic pulse whose duration essentially corresponds to only the duration of the transition, and that in dependence on this characteristic pulse, the influencing means (formed by an electronic switch in the delay branch of the filter means) ensures, only for the duration of this characteristic pulse, that the propagation of the comb-filtered color signal is terminated and that the propagation of the non-filtered color signal to a switching stage succeeding the filter means is activated, in that the influencing means provides for substantially complete suppression of the color signal delayed by means of the delay branch of the filter means. It has been found in practice that, despite such influencing of the filter means, a disadvantageous color signal delay occurs which has a disturbing effect, notably in the visually observable rendition of, in that case, horizontally extending color transitions, because it induces a shift of the color information in the vertical direction towards the lower end of the picture and the shift extends across every color transition of this kind.

SUMMARY OF THE INVENTION

It is an object of the invention to eliminate the described problems and to provide an improved circuit arrangement of the kind set forth in the first paragraph, and an improved video recorder of the kind set forth in the second paragraph, offering improved signal processing and, hence, a perfect visually observable rendition of the processed video signals.

In order to achieve this object, a circuit arrangement of the kind set forth in the first paragraph according to the invention is characterized in that control information generating means is inserted in the connection means between the transition detection means and the influencing means, the control information generating means receiving the characteristic information generated by the transition detection means, and generating, in dependence on the reception of characteristic information, control information which is applied to the influencing means and enables termination of the propagation of the comb-filtered component of the video signal and activation of the propagation of this component of the video signal in at least essentially non-filtered form, for a period of time which is longer than is possible by means of the characteristic information. Thus, using only a few additional means, it is achieved that for a period of time lasting several lines, the influencing means ensures influencing of the termination of the propagation of the comb-filtered component of a video signal and, instead, activates the propagation of the component of the video signal in non-filtered form, so that a component of a video signal which has been delayed by more than one line, for example, by the filter means but also by other means inducing a delay, does not have a disturbing effect on the visually observable rendition of a transition extending in the vertical direction.

The transition detection means in such a circuit arrangement may be constructed so as to output a digital data word or a characteristic pulse as the characteristic information. In a circuit arrangement according to the invention in which the transition detection means is constructed so as to output a characteristic pulse as characteristic information, it has been found that it is advantageous when, additionally, the control information generating means, receiving an output characteristic pulse, includes a pulse stretching circuit, whereby control information is generated and output as a control pulse which has been stretched relative to a characteristic pulse received. This is advantageous notably with a view to realizing a particularly simple circuitry.

For a circuit arrangement according to the invention, it has also been found to be advantageous when, additionally, the filter means is formed by a recursive filter having a delay branch including a feedback factor adjusting stage as the controllable influencing means, a feedback factor being variable between the value "1" and the value "0" in said feedback factor adjusting stage, the pulse stretching circuit being connected to the feedback factor adjusting stage, and upon appearance of a stretched control pulse, the feedback factor being reduced or set to the value "0" for the duration of the stretched control pulse. Such an embodiment has proven to be particularly effective in practice in that the filter means is provided for noise suppression purposes. For a circuit arrangement according to the invention in which the transition detection means is constructed so as to output a characteristic pulse as characteristic information, it has also been found to be advantageous when, additionally, the control information generating means, receiving an output characteristic pulse, includes an input terminal for receiving the characteristic pulse, a direct channel connected to the input terminal for practically non-delayed propagation of the characteristic pulse received, and a delay channel connected to the input terminal and including further delay means, whereby the characteristic pulse received is delayed by the duration of at least one line, and combination means following the direct channel (80) and the delay channel, having a logic OR-function, and outputting control information in the form of a non-delayed characteristic pulse, and subsequently a delayed characteristic pulse. This is particularly advantageous in that in successive lines, it enables termination of the propagation of a comb-filtered component of a video signal, each time in the same line area which corresponds to the length of a vertical transition and hence to the duration of a characteristic pulse, at the same time, the propagation of this component of the video signal in non-filtered form being activated instead.

In order to solve the above problem, a video recorder of the kind set forth in the second paragraph according to the invention is characterized in that control information generating means is included in the connection means between the transition detection means and the influencing means, the control generating means receiving the characteristic information generated by the transition detection means, and generating, in dependence on the reception of characteristic information, control information which is applied to the influencing means so as to terminate the propagation of the comb-filtered component of the video signal, and activate the propagation of this component of the video signal in at least essentially non-filtered form for a period of time which is longer than is possible by means of the characteristic information. Thus, in a video recorder according to the invention, advantages are achieved which correspond to the advantages disclosed in the foregoing for a circuit arrangement according to the invention.

The advantageous further embodiments of a video recorder according to the invention offer advantages which correspond to the advantages previously disclosed for the advantageous embodiments of a circuit arrangement according to the invention.

The foregoing aspects and further aspects of the invention will become apparent from the two embodiments described hereinafter and will be illustrated with respect thereto.

BRIEF DESCRIPTION OF THE DRAWINGS

The invention will be described in detail hereinafter on the basis of two embodiments which are shown in the drawings, however, without the invention being restricted thereto. In the drawings.

DESCRIPTION OF THE PREFERRED EMBODIMENTS

Figure 1:
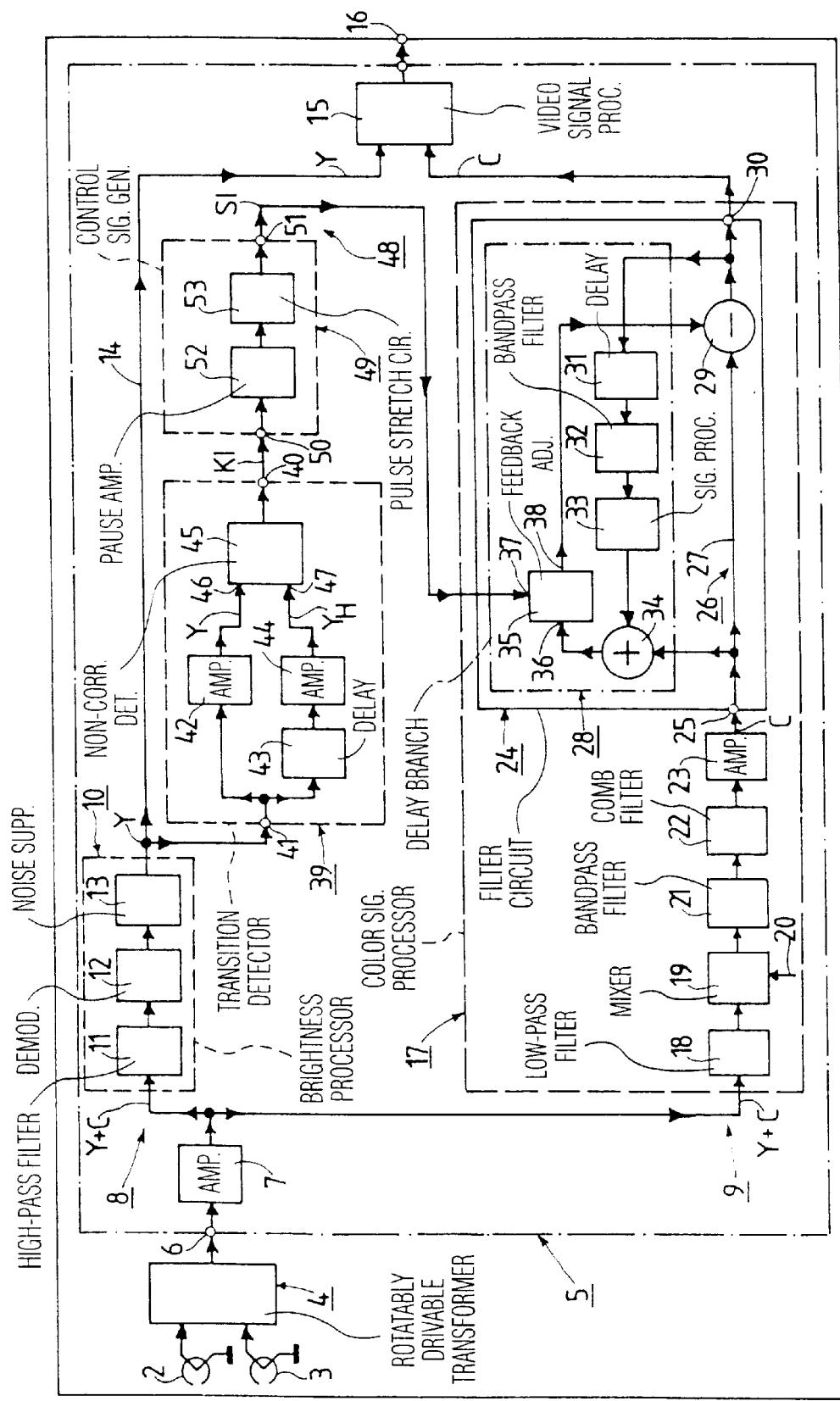
FIG. 1 shows, diagrammatically, a first embodiment of a video recorder and a circuit arrangement in the video recorder according to the invention, including control information generating means for generating control information for influencing means, the control information generating means being formed by a pulse stretching circuit.

FIG. 1 shows a video recorder 1. The video recorder 1 includes two rotatably drivable magnetic heads 2 and 3 whereby a magnetic tape can be scanned in known manner along helical, adjacent tracks in order to play back color video signals recorded on the magnetic tape. A device 4 with rotatably drivable transformers as well as a head switching device (not shown) is connected to the magnetic heads 2 and 3 in known manner.

A circuit arrangement 5 for processing a playback color video signal is connected to the device 4. To this end, the circuit arrangement 5 includes an input 6 which can receive a playback color video signal from the device 4. A so-called head amplifier 7 is connected to the input 6; this amplifier amplifies a playback color video signal from the magnetic heads 2 and 3. A playback color video signal can be applied from the head amplifier 7 to a brightness channel 8 and a color channel 9. It is to be noted that a playback color video signal may include video signal segments which represent vertical transitions in a visually observable rendition on a display screen of a television apparatus or on a display device of another display apparatus.

The brightness channel 8 can process a brightness component, so a brightness signal Y, of a playback color video signal. Brightness signal processing means 10 is provided for this purpose. The brightness signal processing means 10 includes a highpass filter 11 which succeeds the head amplifier 7, an FM demodulator 12 which succeeds the high-pass filter 11, and a brightness signal noise suppression stage 13 which succeeds the FM demodulator 12. It is to be noted that the brightness signal processing means 10 also includes, or may include, further signal processing stages which, however, are not described herein because they are not of essential importance in this context. The brightness signal noise suppression stage 13 can deliver a processed brightness signal Y which can be applied to a video signal processing device 15 via an electrically conductive connection 14 in the brightness channel 8.

The video signal processing device 15 is connected, via an output of the circuit arrangement, to diagrammatically represented output means 16 of the video recorder 1. The output means 16, for example, formed by a so-called SCART connector, can apply a playback color video signal processed by the circuit arrangement 5 or the video recorder 1, for example, to a television receiver.

A color component, so a color signal C, of a playback color video signal can be processed in the color channel 9. The color channel 9 is provided with color signal processing means 17 for this purpose. The color signal processing means 17 includes a low-pass filter 18 which is connected to the head amplifier 7. The low-pass filter 18 outputs a color signal C with a frequency around 627 kHz; this signal is applied to a mixing stage 19 connected to the low-pass filter 18. Via an electrically conductive connection 20, the mixing stage 19 can receive a mixing signal of a frequency of approximately 5.06 MHz from a mixing signal generator (not shown). The playback color signal C is retransposed in the mixing stage 19 so that the mixing stage 19 outputs a retransposed color signal C having a frequency around 4.43 MHz; this signal is applied to a bandpass filter 21 which succeeds the mixing stage 19. A comb filter 22 is connected to the bandpass filter 21. The comb filter 22 serves to eliminate crosstalk as has since long been known. In the present case, the comb filter 22 is succeeded by an amplifier stage 23 whose output supplies a retransposed color signal C which is substantially free from crosstalk. It is to be noted that the color signal processing means 17 additionally includes, or may include, further signal processing stages which, however, are not described herein because they are not relevant in the present context.

The color signal processing means 17 also includes filter means 24 which is connected to the amplifier stage 23, and serves to achieve noise suppression in the color signal C of a playback color video signal. The filter means 24 includes an input 25 which can receive the color signal C output by the amplifier stage 23. The filter means 24 can process the color component, i.e., the color signal C, of a playback color video signal according to the comb filter principle.

The filter means 24 includes a direct branch 26 which is simply formed by an electrically conductive connection 27 in the present case. The direct branch 26 propagates the processable color signal C of a playback color video signal without delay. The filter means 24 also includes a delay branch 28 whose construction will be described in detail hereinafter. Finally, the filter means 24 also includes combination means 29 which succeeds the direct branch 26 and the delay branch 28 and is formed, in the present embodiment, by a subtraction stage 29 for the subtraction of the signals applied thereto. The subtraction stage 29 outputs the comb-filtered color signal C of a playback color video signal via an output which is connected to an output 30 of the filter means 24. The output 30 of the filter means 24 is connected to the video signal processing device 15 which thus forms a switching stage which succeeds the filter means 24 and serves to process the comb-filtered color signal C of a playback color video signal.

The delay branch 28 of the filter means 24 includes delay means 31 which is, in this case, formed by a charge-coupled device 31 (CCD). The input of the charge-coupled device 31 is connected to the output of the subtraction stage 29. The charge-coupled device 31 is capable of delaying the signal applied thereto, i.e., the comb-filtered color signal C, by two lines (2 H). A bandpass filter 32 is connected to the charge-coupled device 31. Connected to the bandpass filter 32 is a signal processing stage 33 which is capable of performing automatic gain control and automatic phase control. The output of the signal processing stage 33 is connected to a first input of a summing stage 34 whose second input is connected to the input 25 of the filter means 24. The filter means 24, in the present embodiment, is formed by a recursive filter whose delay branch 28 includes a feedback factor adjusting stage 35. An input 36 of the feedback factor adjusting stage 35 is connected to an output of the summing stage 34. The feedback factor adjusting stage 35 also includes a control input 37 which can receive a control signal as will be described in detail hereinafter. An output 38 of the feedback factor adjusting stage 35 is connected to an input of the subtraction stage 29. A feedback factor can be switched between the value "1" and the value "0" in the feedback factor adjusting stage 35, thus enabling adjustment of the comb filter effect of the filter means 24, formed by a recursive filter, by appropriate adjustment of the relevant feedback factor. When the feedback factor is set or driven to the value "0", the comb filter effect of the filter means 24 is completely switched off so that the propagation of the comb-filtered color signal C at the output 30 of the filter means 24 is terminated and, at the same time, the propagation of the color signal C of a playback color video signal in non-filtered form, via the output 30 of the filter means 24, to the video signal processing device 15 is activated. The feedback factor adjusting stage 35 thus constitutes a controllable influencing means whereby the propagation of the comb-filtered color signal C of a playback color video signal to the video signal processing device 15 can be terminated and, at the same time, the propagation of this color signal C of a playback color video signal, in at least essentially non-filtered form, to the video signal processing device 15 can be activated.

The circuit arrangement 5 also includes transition detection means 39 whereby a vertical transition, represented by the brightness component, i.e., by the brightness signal Y, and also by the color component, i.e., the color signal C, can be detected and whereby, upon detection of such a transition, characteristic information can be generated and output via the output means 40 of the transition detection means 39.

The output means 40 is formed by an output terminal. The transition detection means 39 includes input means 41 which is formed by an input terminal and is connected to the electrically conductive connection 14 in the present embodiment. Via the input means 41, the transition detection means 39 in the present embodiment can receive the brightness signal Y processed by the brightness signal processing means 10.

The transition detection means 39 includes an amplifier 42 which is connected to the input means 41 and serves to amplify the brightness signal Y. The transition detection means 39 also includes a delay device 43 which is connected to the input means 41, for delaying the brightness signal Y by the duration of one line (1 H), and for applying the delayed brightness signal $Y_H$ to a controllable amplifier 44 for amplifying the delayed brightness signal $Y_H$. The transition detection means 39 also includes a socalled non-correlation detector 45 which receives the amplified, non-delayed brightness signal Y via a first input 46 and, via a second input 47, the amplified delayed brightness signal $Y_H$. The non-correlation detector 45 determines whether the two brightness signals Y and $Y_H$ applied thereto are correlated, i.e., whether they essentially correspond, or are not correlated, i.e., whether they deviate from one another by more than a given degree.

Figure 2:
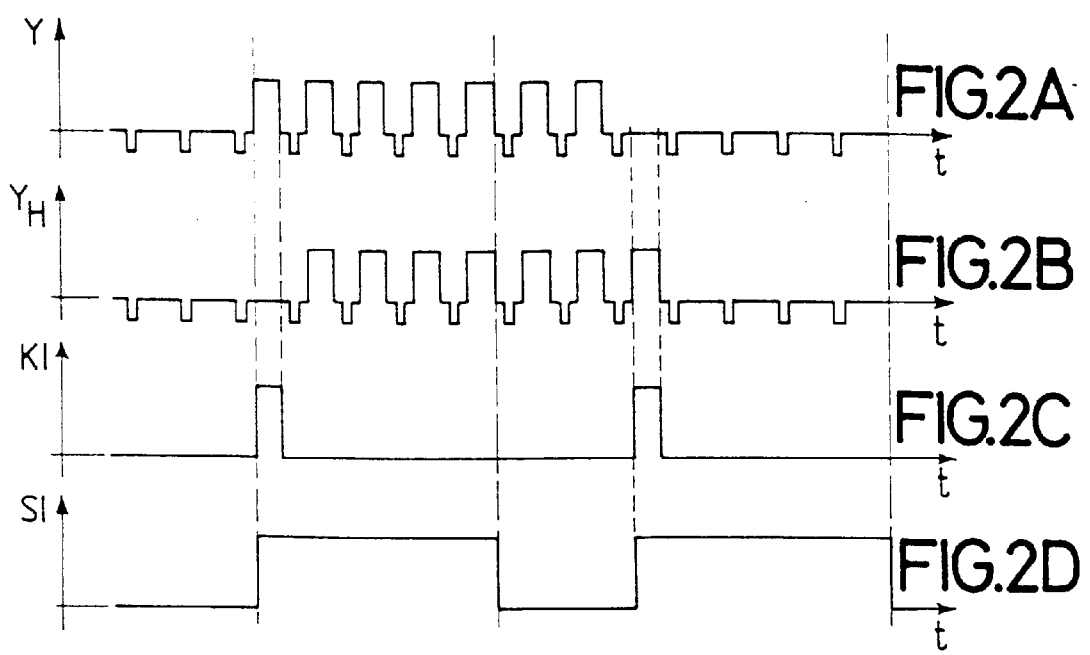
FIGS. 2A, 2B, 2C and 2D show signal waveforms occurring in the circuit arrangement of the video recorder shown in FIG. 1.

FIG. 2A shows a part of the brightness signal Y of a playback color video signal. The brightness signal first of all has an amplitude value which corresponds to the black level. Subsequently, a jump occurs in the brightness signal Y, i.e., to an amplitude value which corresponds to the white level. Thereafter, the brightness signal Y retains the amplitude value in conformity with the white level. Subsequently, a further jump occurs in the brightness signal Y, i.e., to the previously assumed amplitude value which corresponds to the black level. The described signal variation, of course, is given merely by way of example.

FIG. 2B shows the brightness signal $Y_H$ which has been shifted in time by one line (1 H) with respect to the brightness signal $Y_H$ of FIG. 2A by the delay device 43.

When the above two brightness signals Y and $Y_H$ are applied to the non-correlation detector 45, the detector 45 outputs, via the output means 40 of the transition detection means 39, characteristic information in the form of a characteristic pulse KI if the two applied brightness signals Y and $Y_H$ clearly deviate from one another. FIG. 2C shows such characteristic pulses KI.

The output means 40 of the transition detection means 39 is connected to the influencing means, i.e., to the feedback factor adjusting stage 35, via connection means 48, so that in response to the output of characteristic information in the form of a characteristic pulse KI by the output means 40 of the transition detection means 39, the feedback factor adjusting stage 35, acting as influencing means, ensures termination of the propagation of the comb-filtered color signal C of the playback color video signal and activation of the propagation of this color signal C of the playback color video signal in at least essentially non-filtered form.

In the video recorder 1 or th e circuit arrangement 5 shown in FIG. 1, control information generating means 49 is advantageously inserted in the connection means 48 between the transition detection means 39 and the influencing means, formed by the feedback factor adjusting stage 35, in such a manner that an input 50 of the control information generating means 49 is connected to the output means 40 of the transition detection means 39, and an output 51 of the control information generating means 49 is connected to the control input 37 of the feedback factor adjusting stage 35, constituting the influencing means. The control information generating means 49 receives the characteristic information generated by the transition detection means 39. The control information generating means 49 generates, in dependence on the reception of such characteristic information, control information for application to the influencing means so as to terminate the propagation of the comb-filtered color signal C of the playback color video signal and activate the propagation of this color signal C of the playback color video signal in at least essentially non-filtered form, for a period of time which is longer than can be achieved by means of the characteristic information.

In the present embodiment, in which the transition detection means 39 is arranged to output a characteristic pulse KI as the characteristic information, the control information generating means 49 receiving a characteristic pulse, includes a pulse amplifier stage 52 and a pulse stretching circuit 53 which succeeds the pulse amplifier stage 52 and can generate control information in the form of a stretched control pulse SI, i.e., stretched relative to the characteristic pulse KI received, as characteristic information which can be output via the output 51 of the control information generating means 49. FIG. 2D shows such control pulses SI.

In the video recorder 1 or the circuit arrangement 5 of FIG. 1, the pulse stretching circuit 53 is connected to the feedback factor adjusting stage 35 of the filter means 24, in the form of a recursive filter. When such a stretched control pulse SI is applied from the pulse stretching circuit 53 to the control input 37 of the feedback factor adjusting stage 35, the feedback factor is set to the value "0" in the feedback adjusting stage 35 for the duration of the stretched control pulse SI. Consequently, the comb filter effect is deactivated so that, instead of the comb-filtered color signal C, the non-filtered color signal C is output via the output 30 of the filter means 24 so as to be applied to the video signal processing device 15.

The pulse stretching circuit 53 of the present embodiment is constructed in such a manner that a stretched control pulse SI covers the duration of essentially five lines in total. It is to be noted that, evidently, a different duration of the stretched control pulse SI is also feasible, for example, a duration corresponding to only four or three lines, but also to six or seven lines.

Using only simple means in the described video recorder 1, or its circuit arrangement 5, it is advantageously achieved that the feedback factor adjusting stage 35 ensures, for a period of time lasting several lines, the influencing of the termination of the propagation of the comb-filtered color signal C of a playback color video signal and of the activation instead of the propagation of the color signal C of the playback color video signal in non-filtered form, so that a color signal C of a color video signal, delayed by the filter means 24 by the duration of more than one line (1 H), does not have a disturbing effect on the visually observable rendition of a transition extending in the vertical direction.

For the described embodiment, it was assumed that each of two transitions, represented by the two jumps in the brightness signal Y and extending in the vertical direction in a visually observable rendition, extends practically across the entire line length. Evidently, this is to be understood merely as an example, because such a transition may also extend over only a part of the overall line length as is actually often the case in practice.

For the embodiment of the video recorder 1, or its circuit arrangement 5, as described with reference to FIG. 1, it was assumed that the feedback factor is changed or set to the value "0" in response to the appearance of the control information SI at the control input 37 of the feedback factor adjusting stage 35. It is to be noted that the feedback factor need not necessarily be reduced to the value "0" and that changing the feedback factor to a value slightly higher than the value "0" is also feasible.

Figure 3:
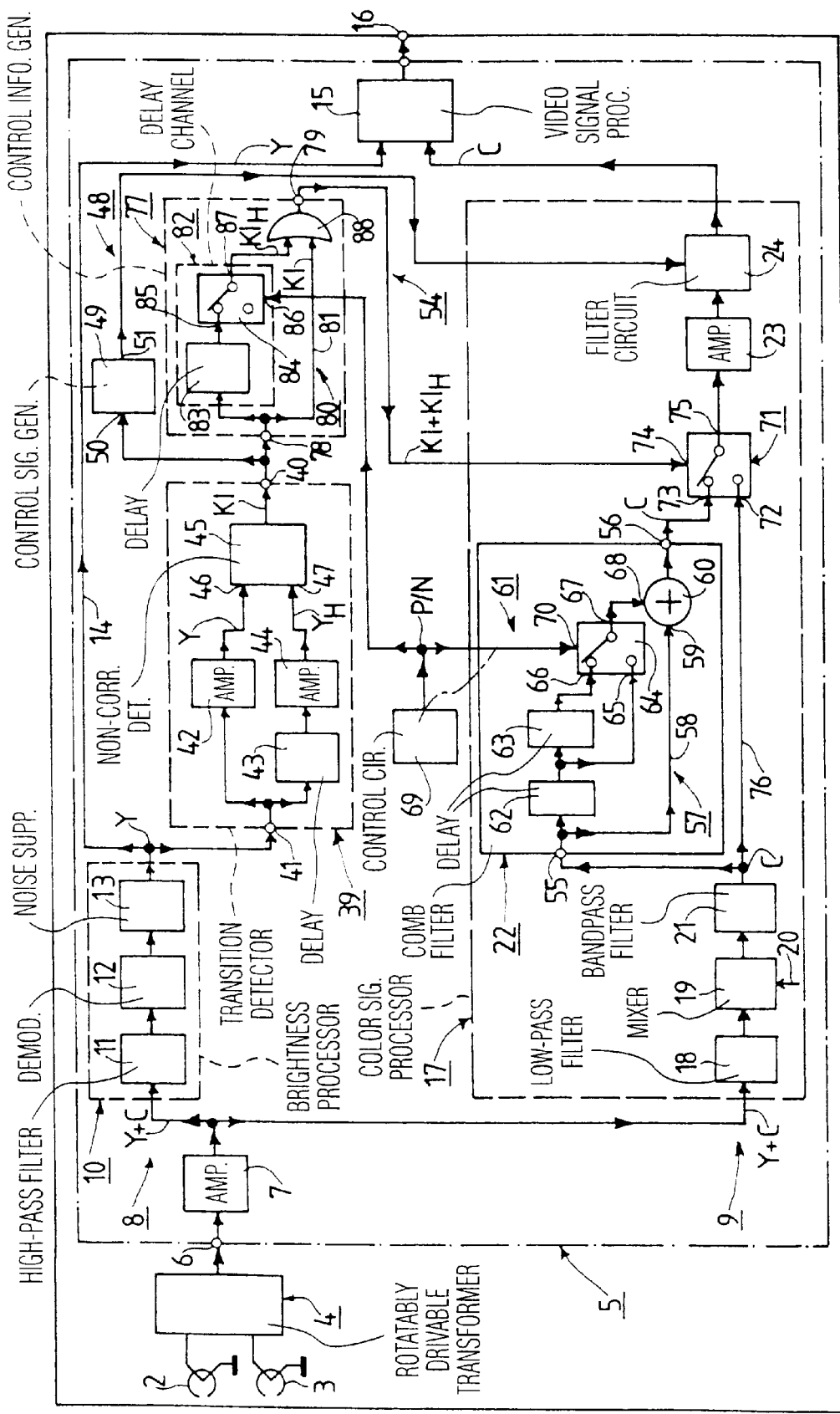
FIG. 3 shows, in the same way as FIG. 1, a second embodiment of a video recorder and a circuit arrangement in the video recorder according the invention, including control information generating means for generating control information for influencing means, and including delay means having a delay of one line as well as combination means with a logic OR-function.

FIG. 3 shows a second embodiment of a video recorder 1 and a circuit arrangement 5 according to the invention. Hereinafter, only those components of the video recorder 1 and its circuit arrangement 5 will be described in respect of which the video recorder 1 or its circuit arrangement 5 deviates essentially from the first embodiment of the video recorder 1 and the circuit arrangement 5 shown in FIG. 1.

FIG. 3 shows the comb filter 22 in the color channel 9 in greater detail. The comb filter 22 forms filter means 22 whereby the color component, so the color signal C, of a playback color video signal can be processed in conformity with the comb filter principle. The comb filter 22 includes an input 55 which is connected to the bandpass filter 21, and an output 56 wherefrom the comb-filtered color signal C can be derived.

The comb filter 22 includes a direct branch 57 which is formed essentially by an electrically conductive connection 58 which connects the input 55 of the comb filter 22 to a first input 59 of a summing stage 60. The color signal C to be processed can be applied to the summing stage 60 practically without delay via the direct branch.

Furthermore, the comb filter 22 includes a delay branch 61. The delay branch 61 includes a first delay stage 62 which is connected to the input 55 of the comb filter 22, and a second delay stage 63 which is connected to the first delay stage 62. The two delay stages 62 and 63 constitute delay means of the delay branch 61. The delay branch 61 also includes a switching stage 64, a first input 65 of which is connected to the output of the first delay stage 62, while a second input 66 is connected to the output of the second delay stage 63. An output 67 of the switching stage 64 is connected to a second input 68 of the summing stage 60. The output 67 of the switching stage 64 is connected to the first input 65 of the switching stage 64 in the case of playback of an NTSC color video signal. In the case of playback of a PAL color video signal, the output 67 of the switching stage 64 is connected to the second input 66 of the switching stage 64. For the control of the switching stage 64, the circuit arrangement 5 is provided with control means 69 whereby a PAL/NTSC switching signal P/N can be generated so as to be applied to a control input 70 of the switching stage 64.

The delay branch 61 thus delays an applied color signal C by one line (1 H) overall in the case of playback of an NTSC color video signal, and by two lines (2 H) in the case of playback of a PAL color video signal.

The video recorder 1 and the circuit arrangement 5 shown in FIG. 3 also include controllable influencing means 71 whereby propagation of the comb-filtered color signal C of a play-back color video signal from the output 56 of the comb filter 22 to the switching stage which succeeds the comb filter 22, and is, in this case, formed by the amplifier stage 23, can be terminated and, at the same time, the propagation of the color signal C of a playback color video signal in non-filtered form to the amplifier stage 23 can be activated. In the present case, the controllable influencing means 71 is formed by a further switching stage 71. The further switching stage 71 includes a first input 72 and a second input 73 and a control input 74 as well as an output 75. The first input 72 is connected, via an electrically conductive connection 76, directly to the output of the bandpass filter 21. The second input 73 is connected to the output 56 of the comb filter 22. The output 75 is connected to the amplifier stage 23. The means connected to the control input 74 will be described in detail hereinafter.

The output means 40 of the transition detection means 39 in the video recorder 1 and the circuit arrangement 5 of FIG. 3, is again connected to the controllable influencing means 71 by means of connection means 54.

In the connection means 54 between the transition detection means 39 and the influencing means 71 in the video recorder 1 and the circuit arrangement 5 of FIG. 3, there is inserted control information generating means 77 which includes an input terminal 78 and an output terminal 79. The input terminal 78 is connected to the output means 40 of the transition detection means 39. The output terminal 79 of the control information generating means 77 is connected to the control input 74 of the influencing means 71, so the further switching stage 71.

The control information generating means 77 includes a direct channel 80 which is connected to the input terminal 78 and consists of an electrically conductive connection 81, and also include a delay channel 82 which is connected to the input terminal 78 and includes further delay means, i.e., a delay device 83. A characteristic pulse KI received at the input terminal 78 can be propagated without delay via the direct channel 80, so the connection 81. The delay device 83 can delay a characteristic pulse K1 received at the input terminal 78 by the duration of one line (1 H) and output it as the delayed characteristic pulse $KI_H$.

The delay channel 82 also includes a switching stage 84 which is connected to the delay device 83 and comprises an input 85, a control input 86 as well as an output 87. The control input 86 is connected to the control means 69 so that the control input 86 of the switching stage 84 also receives the PAL/NTSC switching signal P/N. The PAL/NTSC switching signal P/N ensures that the input 85 of the switching stage 84 is connected to the output 87 in the case of playback of a PAL color video signal, while, in the case of playback of an NTSC color video signal, the connection between the input 85 and the output 87 is interrupted.

The control information generating means 77 also includes combination means 88 which succeeds the direct channel 80 and the delay channel 82, and has a logic OR-function. One input of the combination means 88 is connected to the electrically conductive connection 81 of the direct channel 80, while the other input of the combination means 88 is connected to the output 87 of the switching stage 84 of the delay channel 82. The output of the combination means 88, at the same time, constitutes the output terminal 79 of the control information generating means 77 which is connected to the control input 74 of the further switching stage 71 provided as the controllable influencing means.

The combination means 88, having a logic OR-function, outputs control information in the form of a non-delayed characteristic pulse KI as well as a delayed characteristic pulse $KI_H$.

When a characteristic pulse KI or a delayed characteristic pulse $KI_H$ appears at the control input 74 of the further switching stage 71, the first input 72 of the further switching stage 71 is connected to the output 75 thereof, thus ensuring that propagation of the comb-filtered color signal C of a playback color video signal to the amplifier stage 23 is terminated, and, at the same time, propagation of the color signal C in non-filtered form to the amplifier stage 23 is activated.

Using very simple means, it is thus advantageously achieved that termination of the propagation of a comb-filtered color signal C and simultaneous activation instead of the propagation of the non-filtered color signal C can be realized within successive lines, each time within the same line region which corresponds to the length of a transition extending in the vertical direction and hence to the duration of a characteristic pulse KI and a delayed characteristic pulse $KI_H$. It is thus also achieved that the system-inherent delay time intervals of different length, occurring in the brightness channel 8 and in the color channel 9 in a PAL system, i.e., 1 H for the brightness signal Y and 2 H for the color signal C, are compensated. It is to be noted that instead of the compensation of the different delay time intervals of 1 H and 2 H by additionally delaying the characteristic pulse KI by means of the delay device 83, another compensation of such different delay time intervals of 1 H and 2 H can also take place, i.e., delaying the brightness signal Y occurring ahead of the transition detection means 39, additionally to the 1 H delay executed before in the brightness channel 8, by the duration of one line (1 H) and applying this delayed brightness signal to the transition detection means 39.

What is claimed is:

1. A circuit arrangement comprising:

input means for receiving a video signal containing a brightness component and a color component, said video signal containing a video signal segments representing vertically extending transitions in a visually observable rendition;

filter means coupled to said input means for processing one of the brightness and color components of the video signal in conformity with a comb filter principle, said filter means including a direct branch for propagating the processable component of the video signal essentially without delay, a delay branch, including delay means for delaying the processable component of the video signal by the duration of at least one line, and combination means following the direct branch and the delay branch for combining the component of the video signal propagated essentially without delay and the delayed component of the video signal, and for outputting a comb-filtered component of the video signal;

a switching stage coupled to an output of the filter means for further processing the comb-filtered component of the video signal;

controllable influencing means for terminating the propagation of the comb-filtered component of the video signal to the switching stage, and, at the same time, for activating the propagation of this component of the video signal, in at least essentially non-filtered form, to the switching stage;

transition detection means for detecting a vertically extending transition, represented by at least one of the brightness and color components, said transition detection means, upon detection of such a transition, generating characteristic information, and including output means for outputting the characteristic information; and connection means for connecting the output means of the transition detection means to the controllable influencing means such that, when characteristic information is output via the output means, the controllable influencing means ensures termination of the propagation of the comb-filtered component of the video signal, and activation of the propagation of this component of the video signal in at least essentially of this component of the video wherein said circuit essentially non-filtered form, wherein said circuit comprises:

control information generating means inserted in the connection means between the transition detection means and the influencing means for receiving the characteristic information generated by the transition detection means, and for generating, depending on the reception of characteristic information, control information for application to the characteristic information, control said control information enabling termination of the propagation of the comb-filtered component of the video signal and activation of the propagation of the component of the video signal in at least essentially non-filtered form for a period time which is longer than is possible by controllable influencing means using the characteristic information.

2. The circuit arrangement as claimed in claim 1, wherein:

the transition detection means outputs a characteristic pulse as characteristic information; and the control information generating means receiving the characteristic pulse, and includes a pulse stretching circuit for generating and outputting control information as a control pulse which has been stretched relative to the received characteristic pulse.

3. The arrangement as claimed in claim 2, wherein:

the filter means comprises a recursive filter having a delay branch including a feedback factor adjusting stage comprising the controllable influencing means, a feedback factor being variable between the value "1" and the value "0" in the feedback factor adjusting stage;

the pulse stratching circuit is connected to the feedback factor adjusting stage; and upon appearance of a stretched control pulse, the feedback factor is reduced or set to the value "0" for the duration of the stretched control pulse.

4. The arrangement as claimed in claim 1, wherein:

the transition detection means outputs a characteristic pulse as the characteristic information; and the control information generating means receives the characteristic pulse, the control information generating means comprising:

an input terminal for receiving the characteristic pulse;

a direct channel connected to the input terminal for practically non-delayed propagation of the received characteristic pulse;

a delay channel also connected to the input terminal, said delay channel including further delay means for delaying the received characteristic pulse by the duration of at least one line; and combination means following the direct channel and the delay channel, said combination means having a logic OR-function, and outputting control information in the form of a non-delayed characteristic pulse and, subsequently, a delayed characteristic pulse.

5. A video recorder comprising:

means for providing a video signal containing a brightness component and a color component, said video signal also including video signal segments representing vertically extending transitions in their visually observable rendition; and a circuit arrangement for processing said video signal, said circuit arrangement comprising:

filter means for processing one of the brightness and color components of the video signal in conformity with a comb filter principle, said filter means including a direct branch for propagating the processable component of the video signal essentially without delay, a delay branch including delay means for delaying the processable component of the video signal by the duration of at least one line, and combination means following the direct branch and the delay branch, for combining the component of the video signal propagated essentially without delay and the delayed component of the video signal, said combination means outputting a comb-filtered component of the video signal; a switching stage following the filter means, for further processing the comb-filtered component of the video signal;

controllable influencing means for terminating propagation of the comb-filtered component of the video signal to the switching stage, and, at the same time, for activating propagation of the component of the video signal, in at least essentially non-filtered form, to the switching stage;

transition detection means for detecting a vertically extending transition, represented by at least one of the two components, said transition detection means, upon detection of such a transition, generating characteristic information for application to output means; and connection means for connecting the output means of the transition detection means to the controllable influencing means such that, when characteristic information is output via the output means, the influencing means ensures termination of the propagation of the comb-filtered component of the video signal and activation of the propagation of this component of the video signal in at least essentially non-filtered form, wherein said circuit arrangement further comprises:

control information generating means inserted in the connection means between the transition means and the influencing means, said control information generating means receiving the characteristic information generated by the transition detection means, and generating, depending on the reception of characteristic information, control information for application to the controllable influencing means enabling termination of the propagation of the comb-filtered component of the video signal and activation of the propagation of this component of the video signal in at least essentially non-filtered form for a period of time which is longer than is possible by the controllable influencing means using the characteristic information.

6. The video recorder as claimed in claim 5, wherein:

the transition detection means outputs a characteristic pulse as characteristic information; and the control information generating means receives the output characteristic pulse and includes a pulse stretching circuit for generating and outputting control information as a control pulse which has been stretched relative to the received characteristic pulse.

7. The video recorder as claimed in claim 6, wherein:

the filter means comprises a recursive filter having a delay branch including a feedback factor adjusting stage comprising the controllable influencing means, a feedback factor being variable between the value "1" and the value "0" in the feedback factir adjusting stage;

the pulse stretching circuit is connected to the feedback factor adjusting stage; and upon appearance of a stretched control pulse, the feedback factor is reduced or set to the value "038 for the duration of the stretched control pulse.

8. The video recorder as claimed in claim 5, wherein:

the transition detection means outputs a characteristic pulse as the characteristic information; and the control information generating means receives the output characteristic pulse, the control information generating means comprising;

an input terminal for receiving the characteristic pulse;

a direct channel connected to the input terminal for essentially non-delayed propagation of the received characteristic pulse;

a delay channel also connected to the input terminal, said delay channel including further delay means for delaying the received characteristic pulse by the duration of at least one line; and OR-function means following the direct channel and the delay channel, said OR-function means having a logic OR-function and outputting control information in the form of a non-delayed characteristic pulse and subsequently a delayed characteristic pulse.

* * * * *